W. J. JOHNSTON.
APPARATUS EMPLOYED IN THE MANUFACTURE OF AXLES.
APPLICATION FILED MAR. 11, 1912.

1,047,815.

Patented Dec. 17, 1912.

3 SHEETS—SHEET 1.

Witnesses;
Chas. J. Clagett
Geo. T. Pinckney

Inventor,
William Joseph Johnston
By Jerrell & Son
his Attorneys.

COLUMBIA PLANOGRAPH CO., WASHINGTON, D. C.

W. J. JOHNSTON.
APPARATUS EMPLOYED IN THE MANUFACTURE OF AXLES.
APPLICATION FILED MAR. 11, 1912.
1,047,815.
Patented Dec. 17, 1912.
3 SHEETS—SHEET 2.
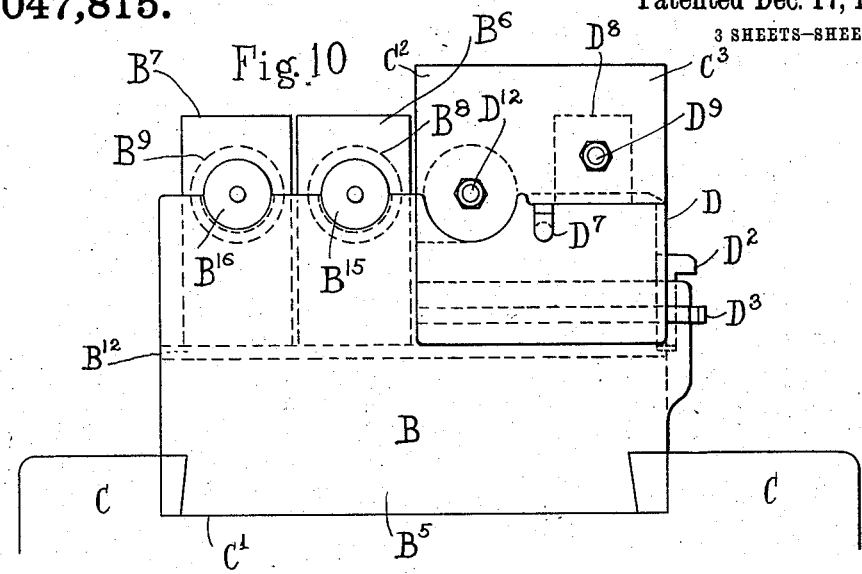
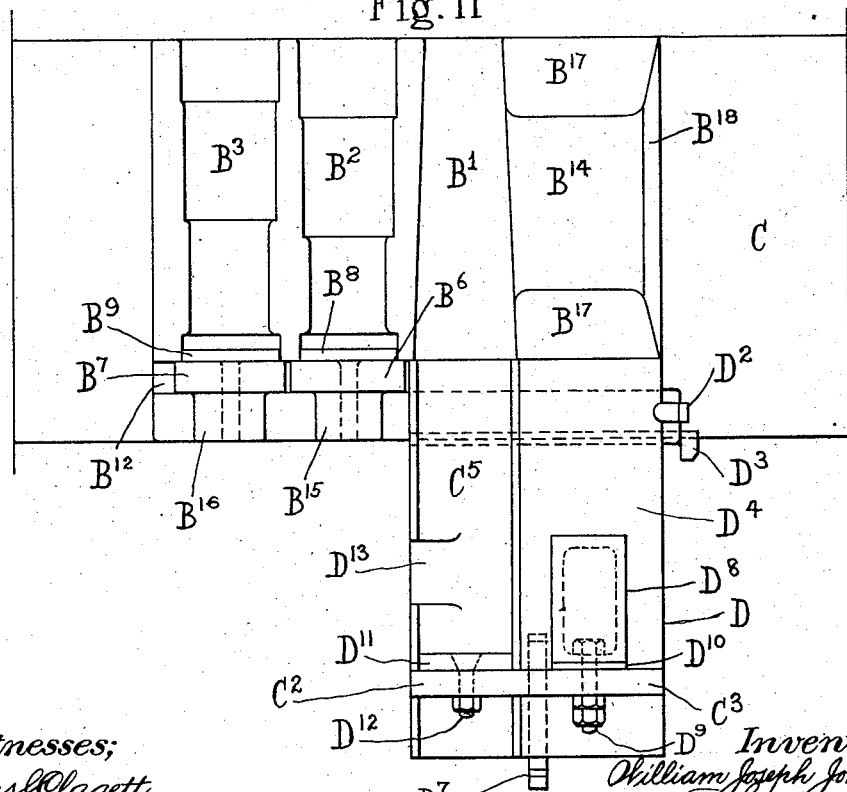
Witnesses:
Chas. F. Clagett
Geo. H. Pinckney
Inventor,
William Joseph Johnston
By Perrell & Son
his Attorneys.

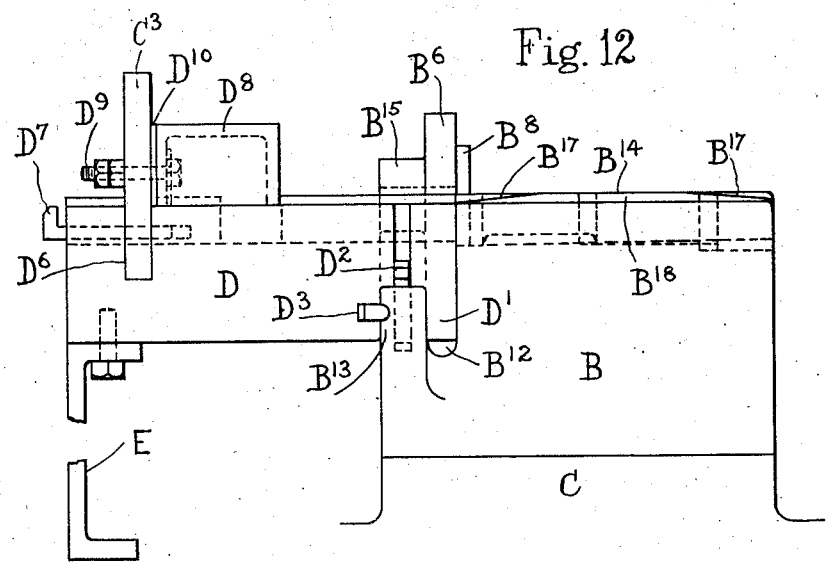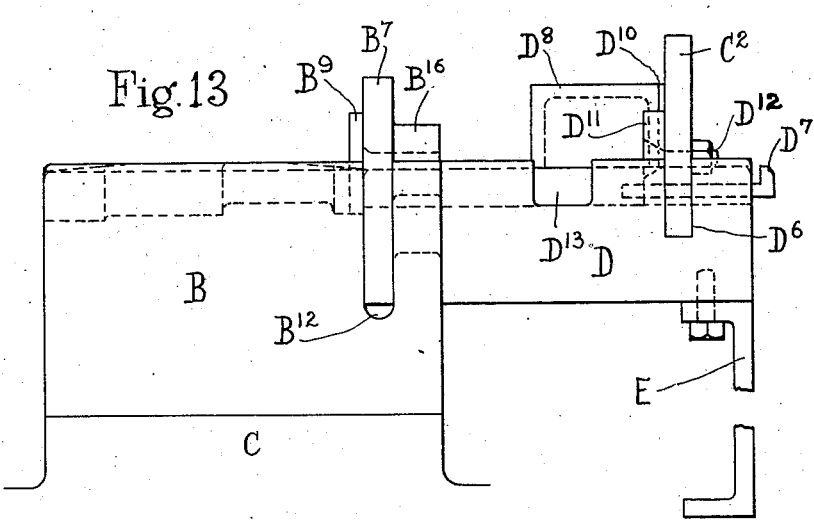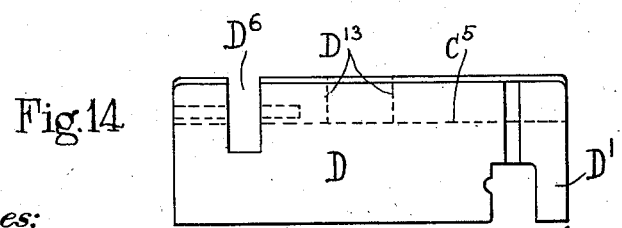

UNITED STATES PATENT OFFICE.

WILLIAM JOSEPH JOHNSTON, OF SHEFFIELD, ENGLAND.

APPARATUS EMPLOYED IN THE MANUFACTURE OF AXLES.

1,047,815. Specification of Letters Patent. Patented Dec. 17, 1912.

Application filed March 11, 1912. Serial No. 682,963.

*To all whom it may concern:*

Be it known that I, WILLIAM JOSEPH JOHNSTON, a subject of the King of Great Britain, residing at Sheffield, in the county of York, England, have invented new and useful Improvements in or Relating to the Apparatus Employed in the Manufacture of Axles, of which the following is a specification.

This invention relates to improvements in that class of apparatus employed in the manufacture at one heat of axles, in which top and bottom blocks are employed having a series of corresponding dies or recesses, which are shorter than the axle required and are each adapted to shape a portion of the axle by placing the heated bloom successively in the various recesses and hammering the same, and the invention consists in means whereby a finished forged axle is obtained with flat ends and of the approximate weight and length required more economically than heretofore as the ends of the bloom are first cut off square or flat to a given weight and length and are retained in this condition, thus obviating the usual cutting off of the ends of the finished axle.

By means of my invention, I avoid the expense of cutting off the ends of the axle after it has been forged, and I avoid this waste of metal, the cost of heating this extra metal and cost of moving it about during the forging operation.

My invention will be better understood by reference to the accompanying drawings, in which:—

Figure 1:
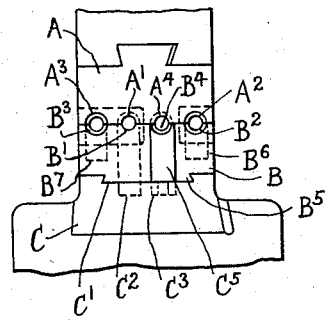
Figure 2:
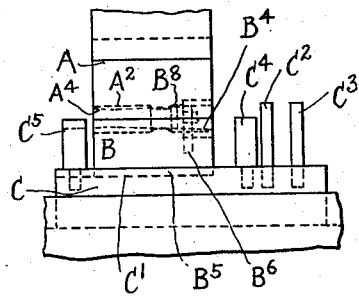
Figure 3:
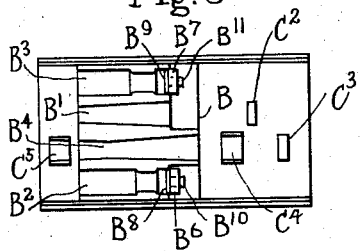
Figure 4:
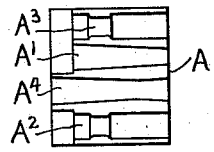
Figure 5:
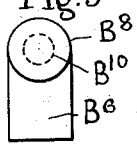
Figure 6:
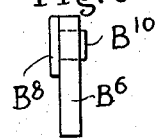
Figure 9:
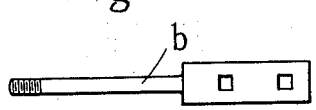
Figure 7:
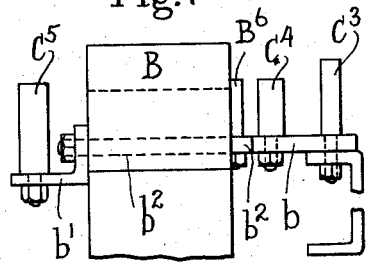
Figure 8:
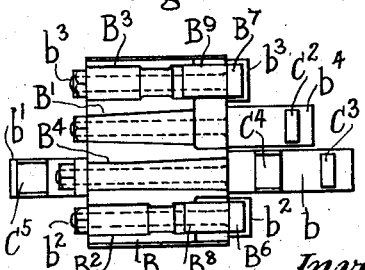

Figure 1 is a front elevation showing part of hammer tup, top block, bottom block and rest for receiving the bottom block in position. Fig. 2 is a side elevation of the same. Fig. 3 is a plan of bottom block and rest showing the grooves, bearers or supports and abutting stops. Fig. 4 is an underside view of top block showing the grooves corresponding to those in the bottom block. Figs. 5 and 6 are front and side elevations showing one of the abutting stops and disk with its spindle on a larger scale. Fig. 7 is a side elevation of a modified construction, and Fig. 8 is a plan of the same. Fig. 9 is a plan of a detail shown in Fig. 7. A further modification is shown at Figs. 10, 11, 12, 13 and 14, in which:—Fig. 10 is a front elevation, Fig. 11 is a plan, Figs. 12 and 13 are opposite side elevations, and Fig. 14 is a side elevation of a detached part.

Like letters indicate like parts throughout the drawings.

In carrying out my invention as shown in Figs. 1 to 6, I place in the hammer tup, a head or top block A, held thereto in the usual manner, and of suitable size, having a series of grooves $A'$, $A^2$, $A^3$ and $A^4$ of a desired formation, and in the corresponding bottom block B, a similar series of grooves $B'$, $B^2$, $B^3$ and $B^4$, so that when the faces of the top block A and the bottom block B meet, the grooves form holes having circular cross sections. The bottom block B is preferably secured in any suitable manner in a carrier or rest C, the latter having a groove $C'$ of any desired size to receive an undercut part $B^5$ held against a shoulder in the groove $C'$ which regulates the position of the bottom block B relatively to that of the top block or head A and also allows for its removal. The carrier or rest C is held securely in the hammer block by any known means. It will be noticed that the grooves in the top and bottom blocks A and B vary in formation and length, and at a defined distance from the back or end of two of the grooves in the bottom block B, projections or stops $B^6$ and $B^7$ are in one with or secured to the bottom block B and preferably carry disks $B^8$, $B^9$, having spindles $B^{10}$, $B^{11}$, which fit in holes in the stops $B^6$, $B^7$, and centrally or in a line with their respective grooves $B^2$, $B^3$. These disks may vary in thickness and slightly overlap the ends of their respective grooves. The disks $B^8$, $B^9$, are thus in contact with the grooves $B^2$, $B^3$, and form end walls to the dies. They produce a flat end on the bloom as the metal is squeezed or hammered out against them. As shown in Figs. 1, 2 and 3, another stop $C^2$, placed at a certain distance from the back end of the groove $B'$, is in one with or secured to the carrier or rest C, and this stop $C^2$ may also carry a similar disk centrally with respect to its corresponding groove $B'$. A similar stop $C^3$ is also placed at a certain distance from the back end of the groove $B^4$ and is in one with or secured to the carrier or rest C centrally with such groove $B^4$. At any suitable distance, preferably on each side of the groove $B^4$, I arrange suitable bearers or supports $C^4$, $C^5$, held in the carrier or rest C and of any desired shape which may be adjustable so as to be raised, lowered or removed in any convenient manner, and in a line with the groove $B^4$. Also, if necessary, similar bearers or supports may be used in a line with the groove $B'$ on either side or both sides. The stops and bearers or supports may be otherwise supported in suitable relation to the bottom hammer block. For instance, in the construction shown in Figs. 7 and 8, the bottom block B is formed with a number of holes through which are passed bolts, one of which is shown separately in plan in Fig. 9. This bolt $b$ has a large flat head provided with holes or sockets to receive part of the rest $C^4$ and stop $C^3$. The other end of this bolt $b$ carries a bracket $b'$ which supports the rest $C^5$. Two other bolts $b^2$, $b^3$, having flat heads support the stops $B^6$ and $B^7$, and another bolt $b^4$ with a flat head, supports the stop $C^2$.

It will be seen that the grooves $A'$, $B'$, in the top and bottom blocks A, B, are a gradual taper toward their front. The grooves $A^2$, $B^2$, $A^3$, $B^3$, are formed with a part of smaller diameter toward their back ends, and at the extreme ends they are similar in diameter to their front parts. The grooves $A^4$, $B^4$, are longer and are tapered from their back end to nearly their front, at which point the groove increases in diameter in the opposite direction. By the aforesaid stops and rests I obviate extending the length of the grooves and the blocks, as the stops form abutments for the end of the bloom and the rests support the bloom. I take a heated bloom of round, octagon or square section, the corners of which are off, say about ¼ inch larger in diameter than the required finished forged axle, and saw the ends off square to an approximate given length. After this I place one of the square ends dead against the face of the stop $C^2$ and centrally over the mold $B'$ and commence to hammer, bringing the top mold A into operation and forming that part of the rolled bloom into the shape of this mold, while the overlapping portion of the rolled bloom or bar is not touched, after which I raise the top block A and place the bloom or bar into the mold $B^2$ with its end dead up against the stop $B^6$ or disk $B^8$ and I bring the corresponding top mold $A^2$ into operation by hammering and partly form the collar and journal or neck of the one end of the axle and a portion of the wheel seat. In this operation the collar at the end of the axle is formed with a flat end face. Then I transfer the part last operated upon into the mold $B^3$ and by similar treatment the collar is practically completed together with its journal or neck and wheel seat, and the forging is now placed in a larger mold $B^4$ with its end dead up against its corresponding stop $C^3$ and resting on the bearers or rests $C^4$, $C^5$, and being similarly hammered, the tapered portion of the axle is formed to its center or half, and slightly beyond. Thus half of the finished axle is formed. By repeating the process on the other unfinished portion of the bloom, the forged axle is completed without waste, to an approximate length and weight with square ends under the hammer, at one heat, and with a great reduction of the size of the tools or blocks. The supports or bearers $C^4$, $C^5$, are placed in position to prevent the axle from bending when operated upon. The aforesaid stops may be made of any suitable strength and the disks of any desired thickness according to requirements. In the case of the disks $B^8$ and $B^9$, the thicker the disk, means a reduction in the thickness of the collar on the journal or neck, or if thinner, the reverse. Also the abutments for the grooves $A^2$, $A^3$, $B^2$, $B^3$, forming the journals or necks, may be constructed in one with the mold, or may be separate and let in in any convenient manner, and their lengths may vary according to requirements, and I may employ more or less grooves in the blocks as desired.

The construction shown in Figs. 10, 11, 12, 13 and 14 is very similar to those shown in Figs. 1 to 9, the principal differences being the omission of one rest, the substitution of a flat surface $B^{14}$ for the groove $B^4$ and an improved method of carrying the stops $C^2$, $C^3$, and the rest $C^5$. The bottom block B has, preferably, three grooves or recesses $B'$, $B^2$, and $B^3$ of suitable formation, and also has a flat surface or portion $B^{14}$. I also construct the hammer head or top block in the hammer tup with grooves and a flat corresponding to those in the bottom block B, so that when the hammer head or top block rests on the bottom block B, the grooves or recesses form holes having circular cross sections and the two flat surfaces are nearly in contact. The bottom block B is held securely on its foundation bed C. On the front portion of the bottom block B, I secure an additional portion or extension D, preferably having a narrow part $D'$ which fits in a groove or recess $B^{12}$ in the bottom block B and a part $B^{13}$ of the bottom block fits between the part $D'$ and the main part of the extension D. The extension D is further secured to the bottom block B by a vertical key $D^2$ and by a horizontal key $D^3$, as shown in Figs. 10, 11 and 12, and, if necessary, the extension D is supported by a support E, between the end of the extension block D and the foundation or floor line. The extension block D may be otherwise conveniently attached to or be formed in one with the bottom block B. The addition or extension block D has a flat surface $D^4$ in the same plane as the flat surface $B^{14}$ of the bottom block B, and it has a groove or recess $C^5$ acting as a support or bearer in line with the taper groove B' in the bottom block B.

Near the outer edge of the extension block D, I preferably form a slot or recess $D^6$ to receive a plate $C^2$, $C^3$, which forms abutments or stops and is secured by a suitable key or bolt $D^7$, or by other means; or the abutments $C^2$, $C^3$, may be formed in one with the extension block D. On the flat portion $D^4$ of the extension block D, I place an adjusting piece or block $D^8$, bolted or secured to that part of the abutment marked $C^3$ by a suitable bolt and nuts $D^9$, or by other means, so that an adjusting piece or pieces $D^{10}$ may be placed between the abutment $C^3$ and the adjusting block $D^8$ to give any desired distance from the face of the adjusting block $D^8$ to the center of the flat surface $B^{14}$. Disks $D^{11}$ of various thicknesses may also be secured to that part of the abutment or stop $C^2$ by a taper headed bolt $D^{12}$, or by other means so as to act also as a distance piece. A slot or opening $D^{13}$ is preferably formed at the side of the extension D leading into the grooved support $C^5$ for the convenience of clearing away the scale from that groove. At the front of the bottom block B, and in part of the same groove or recess $B^{12}$, in which the part D' rests, I place a plate or plates $B^6$, $B^7$, preferably carrying bosses $B^{15}$, $B^{16}$, and both centrally fitting or resting in a groove or recess formed in that end of the bottom block B to receive them and whereon they rest. Holes are preferably formed in the bosses and the plates to receive the pins or shanks of the disks $B^8$, $B^9$. These disks $B^8$, $B^9$, may also be in one with the plates $B^6$, $B^7$, or otherwise conveniently secured thereto as may be desired. The plates $B^6$, $B^7$, with their bosses $B^{15}$, $B^{16}$, are in a line with their respective grooves or recesses $B^2$, $B^3$.

I take the heated bloom with its ends previously cut off square and to a desired length and weight and place one end part of it on the flat portion $B^{14}$ of the bottom block B and hammer with the corresponding flat portion in the hammer head or top block as it is rotated, so as to remove the scale therefrom and reduce the size thereof. After this I place the end of the bloom square against the face of the adjusting piece or block $D^8$ and hammer another part of the bloom on the flat surface $B^{14}$ of the block B, so as to bring down or reduce that part of the bloom to the diameter required for the tapered part of the axle, when such is being made. The bloom is then placed in the tapered portion B' on the bottom block B and by hammering is further reduced. After the bloom is so reduced I place the end against the disk $B^8$ on the abutment or stop $B^6$ and over the groove $B^2$ and further hammer so as to partly form the collar with a flat end face, the neck or journal and the wheel seat, and its end is then placed against the disk $B^9$ on the abutment or stop $B^7$ and over the groove or recess $B^3$ on the bottom block B, where the collar, with a flat end face, the neck or journal and the wheel seat on the one end of the axle are completed. Then that part of the axle is placed in the groove or recess $C^5$ and its collar is pushed dead up against the disk $D^{11}$ and the taper portion over the taper recess or groove B' and is hammered, so that half the taper portion is finished and consequently half of the complete axle, and by repeating the process on the other portion of the bloom, the axle is completed in one heat to a desired length, weight and diameter with square ends.

It will be noticed in this apparatus that no separated carriers or rests are used as the additional part or extension D on the bottom block B acts as a carrier and prevents the axle bending in the process of manufacture. It will be further noticed that on the bottom block B, I preferably form the flat surface $B^{14}$ beveled at its ends $B^{17}$ to allow freedom of vertical movement of the outer end of the bloom so as to facilitate the reducing process, and I may bevel, if desired, one side $B^{18}$ thereof for the purpose of readily clearing away the scale.

I may vary the form of the grooves or recesses and the details of the apparatus without departing from the spirit of this invention.

What I claim is:—

1. In apparatus employed in the manufacture of axles at one heat, the combination of top and bottom hammer blocks, top and bottom dies carried by said blocks to form the collar, neck and wheel seat and an end wall in contact with and forming part of the said dies to simultaneously produce a flat end face to the collar in a plane at right angles to the axis of the axle, substantially as set forth.

2. In apparatus employed in the manufacture of axles at one heat, the combination of top and bottom hammer blocks, dies in said blocks to form parts of the axle, stops in line with said dies, a disk carried by one stop, said disk being in contact with and forming an end wall to those dies which form the collar, neck, and wheel seat, substantially as set forth.

3. In apparatus employed in the manufacture of axles at one heat, the combination of top and bottom hammer blocks, a pair of dies carried by said blocks to partly form the collar and neck, a flat end wall to said dies to form a flat end face to the collar, a second pair of dies to completely form the collar, neck and wheel seat and a flat wall to this second pair of dies to retain the flat end face on the collar, substantially as set forth.

4. In apparatus employed in the manufacture of axles at one heat, the combination of top and bottom hammer blocks, top and bottom dies carried by said blocks to form the collar, neck and wheel seat, a stop carried by the lower hammer block in line with said dies and a disk carried by said stop, said disk being in contact with and forming an end wall to the dies, substantially as set forth.

5. In apparatus employed in the manufacture of axles at one heat, the combination of top and bottom hammer blocks, dies carried by said blocks to form the collar, neck and wheel seat, an end wall to said dies to form a flat end face to the collar, other dies to form other parts of the axle and stops in line with said other dies, substantially as set forth.

6. In apparatus employed in the manufacture at one heat of axles, the combination of top and bottom hammer blocks, a series of corresponding dies or recesses in said blocks of shape to produce the axle, stops carried by said bottom block, an extension from said bottom block, interfitting parts on the bottom block and on said extension, a groove in said extension acting as a rest, and a plate carried by said extension acting as stops or abutments, substantially as shown and described.

7. In apparatus employed in the manufacture at one heat of axles, the combination of top and bottom hammer blocks, a series of corresponding dies or recesses in said blocks to produce the axle, stops carried by said bottom block, corresponding flats on said block, an extension carried by the bottom block, a groove in said extension and a flat on said extension both acting as rests, and other stops or abutments carried by said extension, substantially as shown and described.

In witness whereof I have hereunto set my hand in presence of two witnesses.

WILLIAM JOSEPH JOHNSTON.

Witnesses:
 THOMAS HARVEY,
 HORACE N. BATT.

---

Copies of this patent may be obtained for five cents each, by addressing the "Commissioner of Patents, Washington, D. C."